(12) United States Patent
Moffatt et al.

(10) Patent No.: US 10,845,504 B2
(45) Date of Patent: Nov. 24, 2020

(54) SELF-ORIENTING BURIED MARKER

(71) Applicant: Textron Inc., Providence, RI (US)

(72) Inventors: Wilbur Keith Moffatt, Freeport, IL (US); Daniel Ugale, San Diego, CA (US); Kenneth Ollie Stark, San Marcos, CA (US); Curtis Clifford Taylor, Vista, CA (US)

(73) Assignee: Tempo Communications, Inc., Vista, CA (US)

( * ) Notice: Subject to any disclaimer, the term of this patent is extended or adjusted under 35 U.S.C. 154(b) by 445 days.

(21) Appl. No.: 15/821,208

(22) Filed: Nov. 22, 2017

(65) Prior Publication Data

US 2019/0154788 A1 May 23, 2019

(51) Int. Cl.
*G01V 15/00* (2006.01)
*F16L 1/11* (2006.01)
*G01S 1/68* (2006.01)

(52) U.S. Cl.
CPC .............. *G01V 15/00* (2013.01); *F16L 1/11* (2013.01); *G01S 1/68* (2013.01)

(58) Field of Classification Search
CPC . G01V 15/00; F16L 1/11; G01S 1/042; G01S 1/68
USPC ........................................... 340/572.1–572.8
See application file for complete search history.

(56) References Cited

U.S. PATENT DOCUMENTS

| | | | |
|---|---|---|---|
| 3,875,488 A | 4/1975 | Crocker et al. | |
| 4,712,094 A | 12/1987 | Bolson, Sr. | |
| 4,761,656 A | 8/1988 | Cosman et al. | |
| 5,063,680 A * | 11/1991 | Wirt | G01C 9/06 33/366.17 |
| 5,699,048 A | 12/1997 | Galloway | |
| 6,097,293 A | 8/2000 | Galloway et al. | |
| 6,246,328 B1 | 6/2001 | Parkinson et al. | |
| 6,259,373 B1 | 7/2001 | Ghahramani | |
| 6,380,857 B1 | 4/2002 | Galloway et al. | |

OTHER PUBLICATIONS

Gimbal. (2016). The American Heritage Dictionary of the English Language (6th ed.). Houghton Mifflin. Credo Reference: https://search.credoreference.com/content/entry/hmdictenglang/gimbal/0 (Year: 2016).*

International Search Report for corresponding PCT/US2018/057440 dated Jan. 11, 2019.

* cited by examiner

*Primary Examiner* — Bernarr E Gregory
*Assistant Examiner* — Fred H Mull
(74) *Attorney, Agent, or Firm* — Sandberg Phoenix & von Gontard, P.C.

(57) ABSTRACT

A marker for burying adjacent an underground structure such that a location of the underground structure can be identified from above a ground surface. The marker comprises a housing, a gimbal beacon retention device pivotally disposed within the housing, and a beacon device carried by the gimbal beacon retention device. The gimbal beacon retention device is structured and operable to orient the beacon device in a desired orientation relative to a ground surface regardless of the orientation of the housing relative to the ground surface.

8 Claims, 11 Drawing Sheets

SELF-ORIENTING BURIED MARKER

FIELD

The present teachings relate to electromagnetic markers that are buried adjacent underground structures such that the location of the underground structures can subsequently be located, and more particularly to such markers that are self-orienting.

BACKGROUND

The statements in this section merely provide background information related to the present disclosure and may not constitute prior art.

Today many companies, e.g., utility companies such as telecommunication companies, electrical utility companies, gas companies, water companies, sewer companies, etc., bury their respective products, or structures, underground. Locating such structures is useful when repairs to the structures are needed and to avoid hitting the structures during subsequent excavation. However, often such structures are made from non-metallic components such as fiber optic cable which can make subsequent identification of the location of such buried structures difficult. Therefore, to make the location of these underground structures easier, companies and utilities often use underground passive electromagnetic markers that can be buried with the structures, i.e., buried next to, adjacent or near the structures, as the structures are being installed and buried. These markers can subsequently be located, and hence the location of the structures can subsequently be identified, with a specialized locating device from above the ground.

There are several known variations of such underground markers. Typically, such markers operate on various standard frequencies such that markers of a certain frequency will be buried with specific structures so that the location of specific structures can be easily and readily identified. Often, the outer shells of the markers can be color coded to correlate with the different frequencies and corresponding structures.

This disclosure provides a new method of leveling the coil inside an underground marker. Previous markers have floated coils on water to ensure the coil is level with the surface. This method requires multiple sealing tasks and creates a marker which is very heavy. Others use three separate coils for each axis to create a spherical field which doesn't need to be leveled but requires three times the components. This new method uses a gimbal solution which mechanically levels the coil with the use of only two inner plastic pieces and one sealing operation.

Generally, the markers comprise a coil connected to an inductor/capacitor (LC) circuit that will resonate and generate an electromagnetic field when subjected to an electromagnetic pulse generated by the locating device. The electromagnetic field generated by the marker can then be detected by the locating device to identify the location of the respective structure. Typically, the electromagnetic field generated by the marker will have a dipole shape and it is important that the orientation of the coil within the marker be such that the dipole shaped electromagnetic field will be generated upward toward, and substantially orthogonal to, the ground surface, as opposed to sideways and substantially parallel to the ground surface. Therefore, to avoid having to carefully orient each marker in the ground as it is being buried, some known markers are typically self-orienting. That is, the markers are constructed such that marker can be tossed into the trench next to the structure and the coil will self-orient within the marker such that the dipole shaped electromagnetic field generated by coil (i.e., the LC circuit) will extend upward, substantially orthogonal to the ground surface.

One known design of such a self-orienting marker floats the coil on a liquid within the marker, whereby the coil will self-orient within the marker such that the electromagnetic field will be generated upward toward the ground surface. Such a method is described in U.S. Pat. Nos. 4,712,094 and 6,246,328. Another known design uses three independent coils that are oriented in a three-axis arrangement (i.e., oriented in an X-Y-Z axis arrangement). This creates a spherical field around the marker such that the orientation of the marker is not important. Such a method is described in U.S. Pat. Nos. 5,699,048 and 6,097,293.

The underground marking industry has become very cost competitive and many customers select the markers based solely on the cost. With hundreds of thousands of markers being sold every year, any reduction in assembly time or material cost can become a large competitive advantage.

Moreover, the several known buried markers in the industry and generally each use free wound coil designs that must be carefully inserted inside a coil holder of the marker. These free wound coils must also be secured inside this holder to ensure the coil doesn't distort its shape when the marker is dropped in to the trench of the buried structure. Another known marker type utilizes coils wound around a ferrite rod, which provides a strong mechanical surface for the coil, but ferrites are expensive and difficult to wind around. Ferrite coils also do not provide an ideal radiated field for underground locating.

SUMMARY

In various embodiments, the present disclosure provides a marker for burying adjacent an underground structure, such that a location of the underground structure can be identified from above a ground surface. Such structures include, but are not limited to, structures installed and buried by utility companies such as telecommunication companies, electrical utility companies, gas companies, water companies, sewer companies, etc. In various instances, the marker comprises a housing, a gimbal beacon retention device pivotally disposed within the housing, and a beacon device carried by the gimbal beacon retention device. The gimbal beacon retention device is structured and operable to orient the beacon device in a desired orientation relative to a ground surface regardless of the orientation of the housing relative to the ground surface.

In various other embodiments, the present disclosure provides a marker for burying adjacent an underground structure such that a location of the underground structure can be identified from above a ground surface, wherein the marker comprises a housing, a self-orienting beacon retention device movingly disposed within the housing, wherein the self-orienting beacon retention device comprises a coil bobbin, and an inductance-capacitance (LC) beacon device carried by the self-orienting beacon retention device. In various instances, the LC beacon device comprises an inductor coil disposed around an exterior surface of the coil bobbin of the self-orienting beacon retention device, and a capacitor operably connected to with the inductor coil. The self-orienting beacon retention device is structured and operable to orient the coil bobbin and the inductor coil in a desired orientation relative to a ground surface regardless of the orientation of the housing relative to the ground surface.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
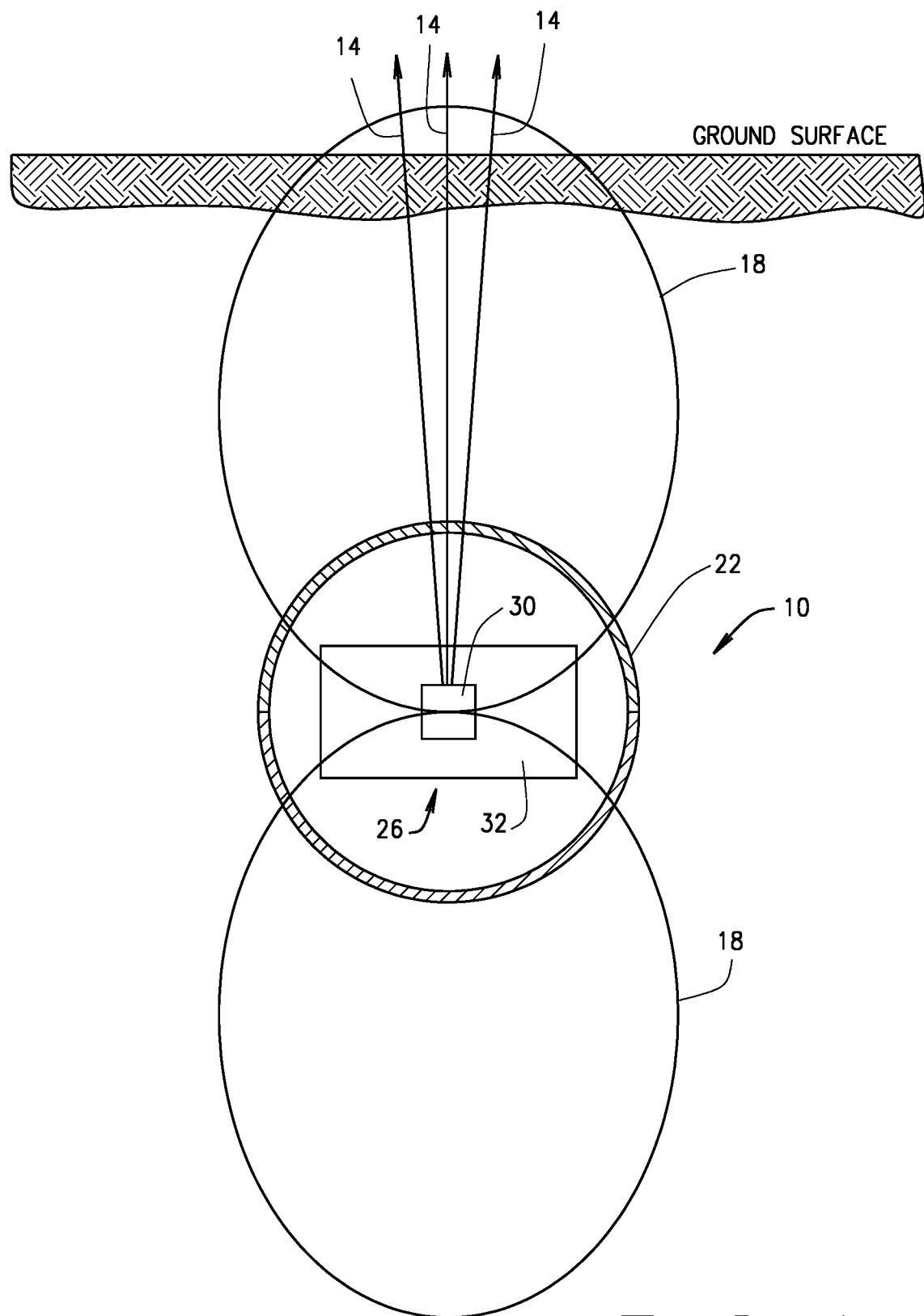
FIG. 1 is a block diagram of a marker device that is used to identify the location of underground structures, the marker including a self-orienting beacon retention device, in accordance with various embodiments of the present disclosure.
Figure 2:
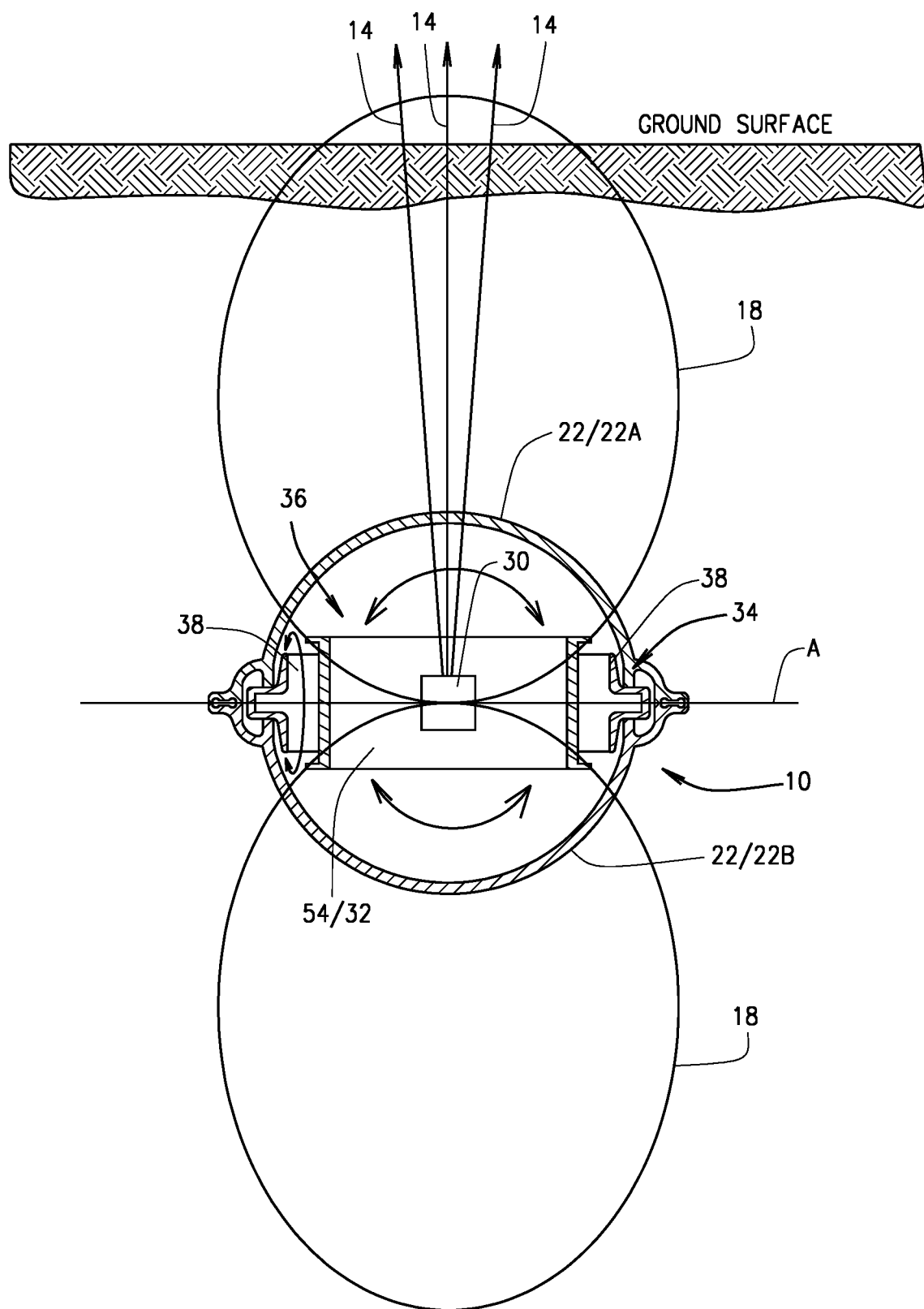
FIG. 2 is cross-sectional view of the marker device shown in FIG. 1 wherein the self-orienting beacon retention device is a gimbal, in accordance with various embodiments of the present disclosure.
Figure 3:
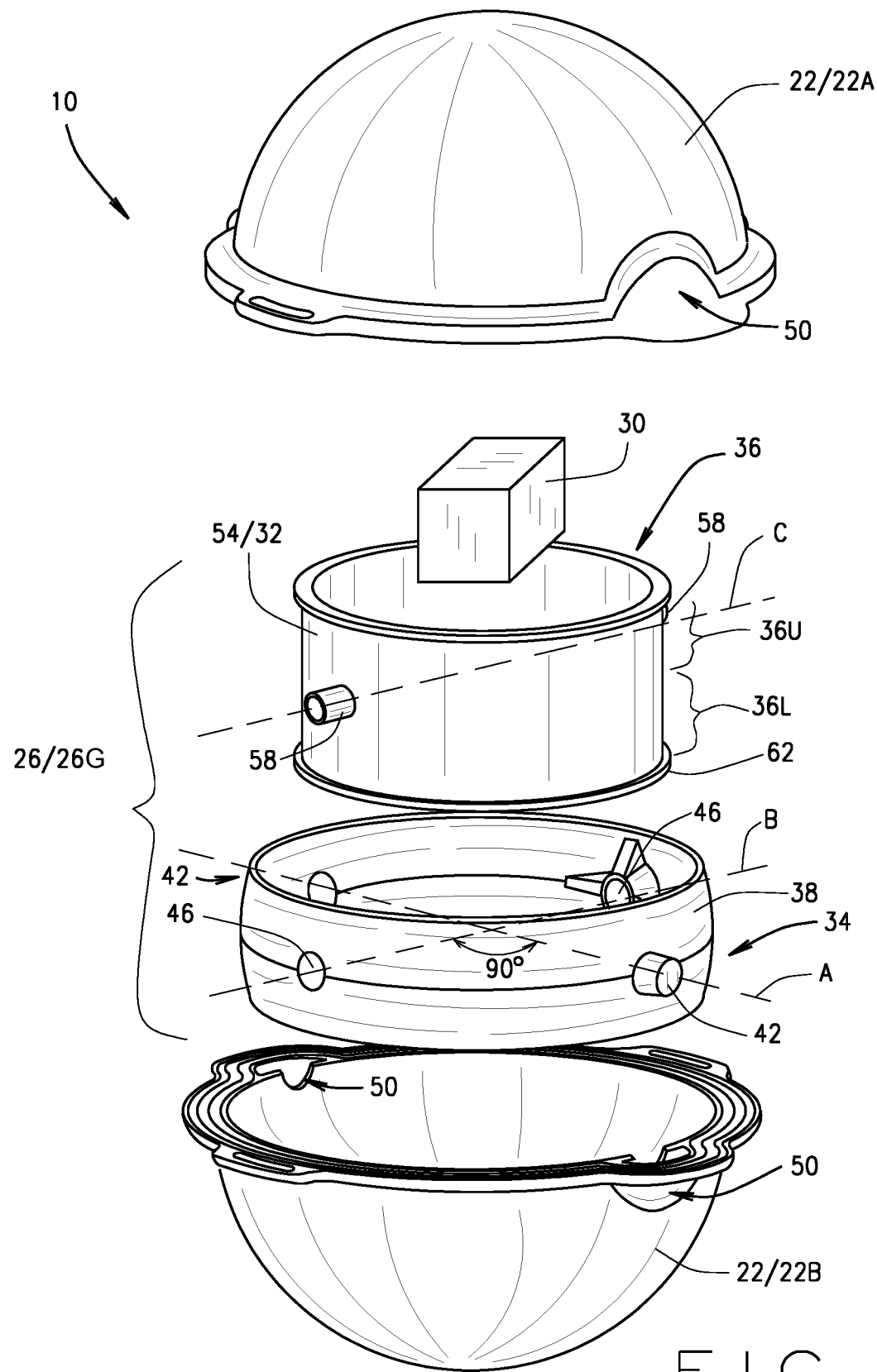
FIG. 3 is an exploded view of the gimbal beacon retention device shown in FIG. 2, in accordance with various embodiments of the present disclosure.
Figure 4:
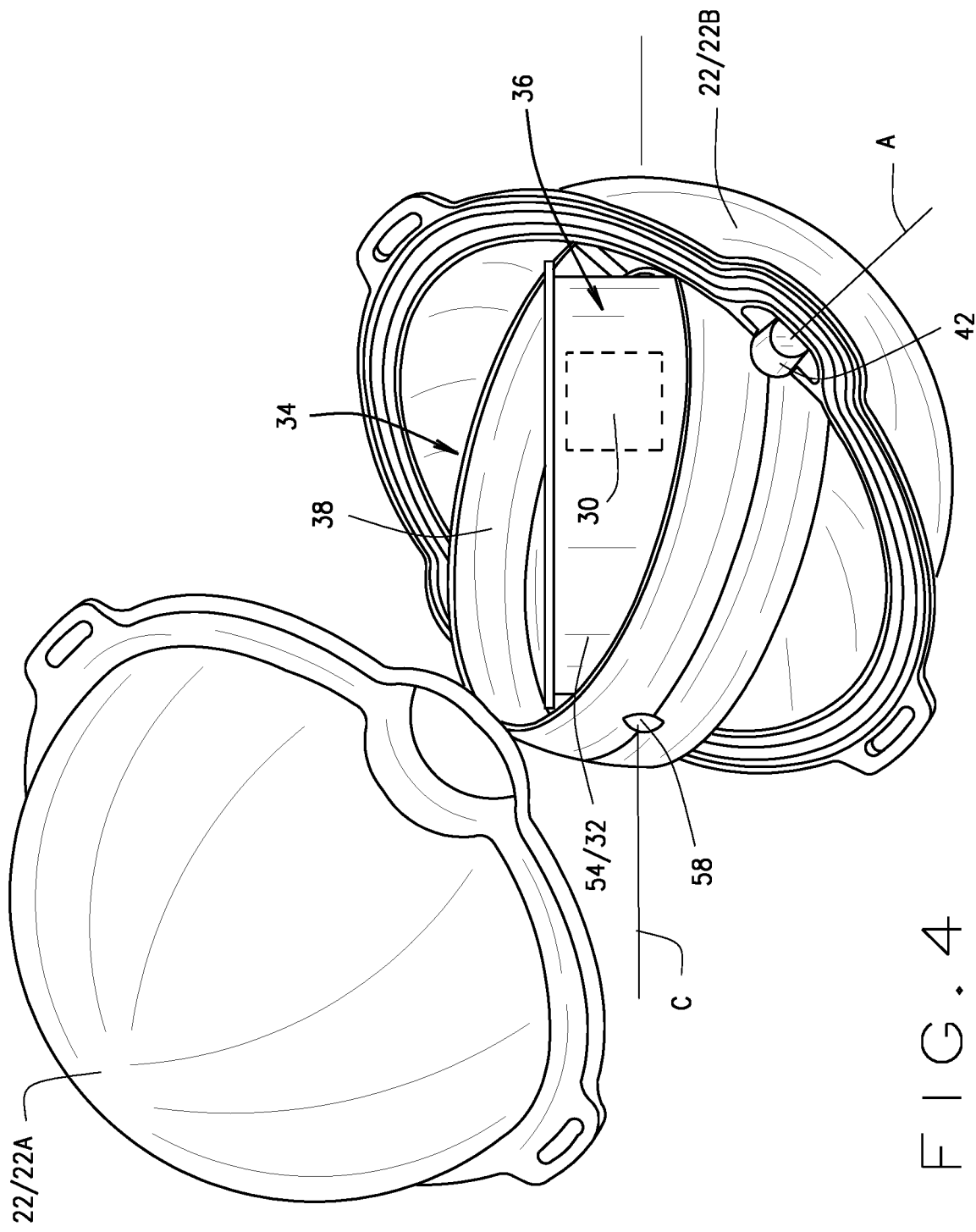
FIG. 4 is an isometric view of the gimbal beacon retention device shown in FIGS. 2 and 3 having a first half of a housing of the marker separated from a second half of the housing, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Referring to FIG. 1, the present disclosure generally provides a marker or locating device 10 that is used to identify the location of underground structures, for example, structures buried by utility companies such as telecommunication companies, electrical utility companies, gas companies, water companies, sewer companies, etc. In use the marker 10 can be buried next to, adjacent or near such structures, as the structures are being installed and buried. Generally, the marker 10 is operable to controllably emit one or more signal or pulse 14, or one or more field 18 that is detectable from above the ground surface by a specialized detection device (not shown), as described further below. Therefore, the location of the marker 10, and hence the corresponding buried structure, can be determined from above the ground surface.

The marker 10 generally comprises a sealed, water-tight housing 22, a self-orienting beacon retention device 26 movably disposed within the housing 22 and a beacon device 30 connected to, or carried by, and retained by the self-orienting beacon retention device 26. The housing 22 can be any sealable, water-tight housing or container that can carry the self-orienting beacon retention device 26 in such a manner that allows the self-orienting beacon retention device 26 to self-orient as described below. Additionally, although the housing 22 is illustrated by way of example throughout the various figures as being substantially spherical in shape, the housing can have any desired shape (e.g., cubical, cylindrical, ellipsoidal, etc.) that will allow the self-orienting beacon retention device 26 to self-orient, and remain within the scope of the present disclosure.

The beacon device 30 can be any signal, pulse or field emitting device structured and operable to controllably generate a ground penetrating signal(s) or pulse(s) 14 or field(s) 18 of sufficient strength such that the signal or pulse 14 or field 18 will penetrate the ground from a depth at which the beacon device 30 is buried (e.g., 1 foot, 2 feet, 3 feet, four feet, or more) and be detectable by the specialized detection device from above the ground surface. It is envisioned that the signal(s) or pulse(s) 14 or field(s) 18 can be any ground penetrating signal(s), pulse(s) 14, or field(s) 18 that can be detected from above the ground surface by the corresponding specialized detection device. For example, in various embodiments, the beacon device 30 can controllably emit electromagnetic or radio frequency (RF) signals 14 or pulses 14 or an electromagnetic field 18 that is/are detectable from above the ground surface by the corresponding specialized detection device. In other example embodiments, the beacon device 30 can emit sound signals or waves 14 (e.g., ultra-high frequency sound signals or wave) that are detectable from above the ground surface by the corresponding specialized detection device.

In various embodiments, the beacon device 30 can be structured and operable to generate the respective signal(s) or pulse(s) 14 or field(s) 18 as controlled by the detection device. That is, in various embodiments, the beacon device 30 can be structured and operable to generate the respective signal(s) or pulse(s) 14 or field(s) 18 in response to a stimulation signal, pulse or field generated or emitted by the detection device. Hence, in such embodiments the beacon device 30 would be dormant or idle until stimulated to operate by the stimulation signal, pulse or field generated or emitted by the detection device. Whereafter, in response to the stimulation signal, pulse or field, the beacon device 30 generates or emits the respective signal(s) or pulse(s) 14 or field(s) 18 that is/are detectable by the detection device. Said another way, the detection device pings the beacon device, and in response thereto, the beacon device 30 generates or emits the respective signal(s) or pulse(s) 14 or field(s) 18. In other embodiments, the beacon device 30 can be structured and operable to be self-controlled. That is, in other embodiments, the beacon device 30 can be structured and operable to self-generate the respective signal(s) or pulse(s) 14 or field(s) 18, that is/are detectable by the detection device. Hence, in such embodiments, the beacon device 30 would be structured and operable to generate or emit the respective signal(s) or pulse(s) 14 or field(s) 18 at a desired temporal pattern, period or sequence without being stimulated, or pinged, by the detection device.

In various instances, in order to lower the complexity and increase the efficiency and ease of detection of the marker 10, it is important that signal or pulse 14 or field 18 be generated or emitted by the beacon device 30 in a direction that is generally orthogonal to the ground surface, more particularly in a direction substantially opposite a line having a direction aligned with the direction of the force of gravity. Therefore, in various embodiments, the self-orienting beacon retention device 26 is structured and operable to self-orient such that the beacon device 30 is disposed in a desired orientation relative to a ground surface, so that the signal or pulse 14 or field 18 will be generated or emitted by the beacon device 30 in a direction that is generally orthogonal to the ground surface (e.g., in a direction substantially opposite a line having a direction aligned with the direction of the force of gravity), regardless of the orientation of the housing 22 relative to the ground surface. The self-orienting beacon retention device 26 can be any single-component or multi-component device disposable within the housing 22 and that is structured and operable orient the beacon device 30 in a desired orientation relative to a ground surface, so that the signal or pulse 14 or field 18 will be generated or emitted by the beacon device 30 in a direction that is generally orthogonal to the ground surface, regardless of the orientation of the housing 22 relative to the ground surface (e.g., in a direction substantially opposite a line having a direction aligned with the direction of the force of gravity).

The self-orienting beacon retention device 26 includes a main body component 32, and may include other components as described below. The beacon device 30 is carried by, connected to or mounted to the main body component 32. That is, in the instances wherein the self-orienting beacon retention device 26 is a single-component device, the single component will comprise a main body component 32 of the self-orienting beacon retention device 26, while in the instances wherein the self-orienting beacon retention device 26 is a multi-component device, one of the multiple components of the device will comprise the main body component 32, as described below.

For example, with reference to FIGS. 1, 2, 3, and 4, in various embodiments the self-orienting beacon retention device 26 can be a gimbal beacon retention device (referred to herein as the gimbal beacon retention device 26G). The gimbal beacon retention device 26G is pivotally disposable within the housing 22. In various instances of such embodiments the housing 22 can comprise a first half 22A and a second half 22B that are connectable together in a sealing, water-tight fashion. The housing first half and second half 22A and 22B can be sealing connected together in a water-tight fashion using any suitable connecting operation such as gluing, sonic welding, threaded engagement, etc., and remain within the scope of the present embodiment. Additionally, in various instances of such embodiments, the housing 22 can include a gasket, washer or other type of seal disposed between the connecting edges of the first and second halves 22A and 22B, and remain within the scope of the present disclosure.

As described above, the gimbal beacon retention device 26G is pivotally disposable within the housing 22. In various embodiments, the gimbal beacon retention device 26G comprises an outer gimbal structure 34 that is pivotally disposable within the housing 22 (e.g., pivotally connectable to the housing 22), and an inner gimbal structure 36 that is pivotally disposable within the outer gimbal structure 34 (e.g., pivotally connectable to the outer gimbal structure 34). In such embodiments, the beacon device 30 is carried by, or connected to or mounted to at least a portion of the inner gimbal structure 36. For example, in various instances the beacon device 30 can be mounted within an interior space or cavity of the inner gimbal structure 36, as described below, while in other embodiments the beacon device 30 can be at least partially carried by, or connected to or disposed on an exterior surface of the inner gimbal structure 36, as described below. As described above, the beacon device 30 can be any signal, pulse or field emitting device structured and operable to generate the ground penetrating signal(s) or pulse(s) 14 or field(s) 18 of sufficient strength such that the signal or pulse 14 or field 18 will penetrate the ground from a depth at which the beacon device 30 is buried (e.g., 1 foot, 2 feet, 3 feet, four feet, or more) and be detectable by the specialized detection device from above the ground surface, e.g., a device that emits electromagnetic or RF signals or pulses 14 or an electromagnetic field 18 or a device that emits sound signals or waves 14 (e.g., ultra-high frequency sound signals or wave).

The outer gimbal structure 34 generally includes an annular body 38, a pair of opposing pivot pins 42 extending radially outward from the annular body 38 and having an axis of rotation A, and a pair of opposing pin receptacles 46 having a longitudinal axis B. The outer gimbal structure 34 is structured such that the axis of rotation A of the pivot pins 42 intersects the longitudinal axis B of the pin receptacles 46 at substantially a right angle (i.e., at substantially a 90° angle). Moreover, the longitudinal axis B of the pin receptacles 46 is substantially coplanar with the axis of rotation A of the pivot pins 42. The housing 22 includes a pair of opposing pivot pin repositories 50 that are sized and structured to receive the outer gimbal structure pivot pins 42 in a freely pivotal manner such that the outer gimbal structure 34 can freely rotate 360° about the axis of rotation A of the pivot pins 42. In various embodiments, as shown by way of example in FIG. 2, each of the housing first and second halves 22A and 22B can include a portion of the opposing pivot pin repositories 50. However, in various other embodiments, one of the housing first half 22A or second half 22B can include the entirety the opposing pivot pin repositories 50. Further yet, in various embodiments, the housing first half 22A and the housing second half 22b can each include a single one of the pivot pin repositories 50.

In various embodiments, the outer gimbal structure 34, or at least the pivot pins 42 can be fabricated of a low friction coefficient material, e.g., Polytetrafluoroethylene (PTFE) or any other low friction coefficient material, such that the outer gimbal structure 34 can freely rotate 360° about the axis of rotation A of the pivot pins 42 in a low friction, or substantially friction free, manner with regard to the contact between the pivot pins 42 and the housing pin repositories 50. In various other embodiments, the housing 22, or at least pivot pin repositories 50 can be fabricated of a low friction coefficient material, e.g., Polytetrafluoroethylene (PTFE) or any other low friction coefficient material, such that the outer gimbal structure 34 can freely rotate 360° about the axis of rotation A of the pivot pins 42 in a low friction, or substantially friction free, manner with regard to the contact between the pivot pins 42 and the housing pin repositories 50. In further embodiments, the outer gimbal structure 34, or at least the pivot pins 42, and the housing 22, or at least pivot pin repositories 50, can be fabricated of a low friction coefficient material, e.g., Polytetrafluoroethylene (PTFE) or any other low friction coefficient material, such that the outer gimbal structure 34 can freely rotate 360° about the axis of rotation A of the pivot pins 42 in a low friction, or substantially friction free, manner with regard to the contact between the pivot pins 42 and the housing pin repositories 50.

The inner gimbal structure 36 generally comprises a chassis 54 and a pair of opposing pivot pins 58 extending radially outward from the chassis 54 and having an axis of rotation C. The pivot pins 54 of the inner gimbal structure 36 are pivotally disposable within the pin receptacles 46 of the outer gimbal structure 34 such that the inner gimbal structure 36, having the beacon device 30 connected thereto, can freely rotate 360° about the axis of rotation C of the pivot pins 58. When the inner gimbal structure 36 is pivotally disposed or mounted within the outer gimbal structure 34, via the pivot pins 58 and pin receptacles 46, the axis of rotation C of the pivot pins 58 is substantially collinear with the longitudinal axis B of the pin receptacles 46. Moreover, since the axis of rotation C of the pivot pins 58 is substantially collinear with the longitudinal axis B of the pin receptacles 46, the axis of rotation C of the pivot pins 58 intersects the axis of rotation A of the pivot pins 42 at a substantially right angle (i.e., at substantially a 90° angle). Therefore, the axis of rotation A of the pivot pins 42 is substantially coplanar with the axis of rotation C of the pivot pins 58. The plane in which the axis of rotation A of the pivot pins 42 and the axis of rotation C of the pivot pins 58 lies will be referred to herein as the A-C plane. It should be understood that in the embodiments wherein the self-orienting beacon retention device 26 of the generic marker 10 shown in FIG. 1 comprises the gimbal beacon retention device 26G as shown in FIGS. 2 through 6, 8 and 9, the main body 32 of the generic self-orienting beacon retention device 26 shown generically in FIG. 1 comprises the inner gimbal structure chassis 54 shown in FIGS. 2 through 6, 8 and 9.

In various embodiments, the inner gimbal structure 36, or at least the pivot pins 58 can be fabricated of a low friction coefficient material, e.g., Polytetrafluoroethylene (PTFE) or any other low friction coefficient material, such that the inner gimbal structure 36 can freely rotate 360° about the axis of rotation C of the pivot pins 58 in a low friction, or substantially friction free, manner with regard to the contact between the pivot pins 58 and the outer gimbal structure pin receptacles 46. In various other embodiments, the outer gimbal structure 34, or at least pivot pin receptacles 46 can be fabricated of a low friction coefficient material, e.g., Polytetrafluoroethylene (PTFE) or any other low friction coefficient material, such that the inner gimbal structure 36 can freely rotate 360° about the axis of rotation C of the pivot pins 58 in a low friction, or substantially friction free, manner with regard to the contact between the pivot pins 58 and outer gimbal structure pin receptacles 46. In further embodiments, the inner gimbal structure 36, or at least the pivot pins 58, and the outer gimbal structure 34, or at least the outer gimbal structure pin receptacles 46, can be fabricated of a low friction coefficient material, e.g., Polytetrafluoroethylene (PTFE) or any other low friction coefficient material, such that the inner gimbal structure 36 can freely rotate 360° about the axis of rotation C of the pivot pins 58 in a low friction, or substantially friction free, manner with regard to the contact between the pivot pins 58 and the outer gimbal structure pin receptacles 46.

Accordingly, as a result of the low friction, or substantially friction free, contact between the outer gimbal structure pivot pins 42 and the housing pivot pin repositories, and the low friction, or substantially friction free, contact between the inner gimbal pivot pins 58 and the outer gimbal pivot pin receptacles 46, the outer gimbal structure 34 can freely rotate 360° about the axis of rotation A of the pivot pins 42, and the inner gimbal structure 36 can freely rotate 360° about the axis of rotation C of the pivot pins 58 will allow a position and/or orientation of the inner gimbal structure, and hence the beacon device 30 at least partially carried by or mounted thereto, to remain substantially constant within the housing 22 regardless of the orientation of the housing 22. More specifically, in various embodiments, in order to retain the inner gimbal structure 36, and hence the beacon device 30, in a substantially constant orientation within the housing 22 regardless of the orientation of the housing 22, the inner gimbal structure 36 is structured such that, with the beacon device 30 at least partially carried by, mounted to or connected to the inner gimbal chassis 54, a lower portion 36L of the inner gimbal structure 36 is heavier than an upper portion 36U of the inner gimbal structure 36. The lower portion 36L of the inner gimbal structure 36 is defined herein to mean the portion of the inner gimbal structure 36 that is disposed below the axis of rotation C of the inner gimbal pivot pins 58 relative to the orientation of the inner gimbal as shown in FIGS. 2 through 6, 8 and 9.

Accordingly, due to the lower portion 36L being heavier than the upper portion 36U, the center of gravity of the inner gimbal structure 36 will be located below the axis of rotation C of the inner gimbal pivot pins 58. Furthermore, since the axis of rotation C of the inner gimbal pivot pins 58 is substantially coplanar with the axis of rotation A of the outer gimbal pivot pins 42, the center of gravity of the gimbal beacon retention device 26G is below both the axes of rotation A and C (i.e., below the A-C plane). Therefore, due to the center of gravity being below the A-C plane, the gimbal beacon retention device 26G will function (i.e., the outer gimbal structure 34 will rotate about the A axis of rotation and the inner gimbal structure 36 will rotate about the C axis of rotation) such that the inner gimbal structure 36 will always be oriented (i.e., will self-orient) such that the lower portion 36L is located below the A-C plane regardless of the orientation of the housing 22 when the marker 10 is at rest (i.e., when the marker 10 is disposed in the ground adjacent a buried structure, e.g., a buried utility structure). More particularly, due to the laws of gravity, the substantially 90° relationship between the A and the C axes of rotation, and the center of gravity of the gimbal beacon retention device 26G being below the A-C plane, the gimbal beacon retention device 26G will self-orient such that the A-C plane will always settle in as substantially horizontal disposition, with the center of gravity below the horizontal A-C plane, regardless of the orientation of the housing 22 when the marker 10 is at rest (i.e., when the marker 10 is disposed in the ground adjacent a buried structure, e.g., a buried utility structure).

It will be understood that, as used herein, stating that the A-C plane is in a substantially horizontal disposition means that all lines through the A-C plane in any direction (e.g., the A and C axes of rotation) will have a substantially horizontal disposition. And, having a substantially horizontal disposition will be understood to mean that all lines through the A-C plane in any direction will intersect a vertical line (i.e., a line having a direction aligned with the direction of the force of gravity) having a common point on the respective line through the A-C plane at substantially a right angle (i.e., substantially a 90° angle). Furthermore, as used herein, the term self-orienting will be understood to mean that the respective self-orienting beacon retention device 26 (e.g., the gimbal beacon retention device 26G) is structured and operable to always orient a desired plane through the respective main body 32 of the respective self-orienting beacon retention device 26 (e.g., the A-C plane of the gimbal beacon retention device 26G) in a substantially horizontal disposition regardless of the orientation of the housing 22 when the marker 10 is at rest (i.e., when the marker 10 is disposed in the ground adjacent a buried structure, e.g., a buried utility structure).

Therefore, since the self-orienting beacon retention device 26 (e.g., the gimbal beacon retention device 26G) will always self-orient (e.g., the gimbal beacon retention device 26G will self-orient so that the lower portion 36L of the inner gimbal structure 36 will be located below the A-C plane, and the A-C plane will be in a substantially horizontal disposition), the beacon device 30 can be carried by, connected to or mounted to the main body 32 of the self-orienting beacon retention device 26 (e.g., carried by, connected to or mounted to the inner gimbal structure 36 of the gimbal beacon retention device 26G) such that the beacon device 30 will always be oriented in a desired orientation regardless of the orientation of the housing 22 when the marker 10 is at rest (i.e., when the marker 10 is disposed in the ground adjacent a buried structure, e.g., a buried utility structure). More specifically, since the self-orienting beacon retention device 26 (e.g., the gimbal beacon retention device 26G) will always self-orient, the beacon device 30 can be carried by, connected to or mounted to the main body 32 (e.g., carried by, connected to or mounted to the inner gimbal structure 36) such that the beacon device 30 will always emit the respective signal(s), pulse(s) or field(s) in a desired direction such that the respective signal(s), pulse(s) or field(s) are easily detectable by the respective detection device from above the ground surface.

Referring now to FIGS. 3, 4, 5 and 6, as described above, in various embodiments, the lower portion 36L of the inner gimbal structure 36 is heavier than an upper portion 36U of the inner gimbal structure 36 so that the center of gravity of the inner gimbal structure 36, and moreover of the gimbal beacon retention device 26G, is below the A-C plane. In various instances, of such embodiments, the inner gimbal structure 36 comprises an anchor weight 62 disposed on the lower portion 36L of the inner gimbal structure 36. The anchor weight 62 can be any device, object, substance, material, etc., that is at least partially connected to, mounted on, disposed on or carried by an interior and/or exterior surface of the lower portion 36L of the inner gimbal structure 36 and is structured to add weight to the lower portion 36L such that when the beacon 30 is at least partially carried by, or connected to or disposed on an interior and/or exterior surface of the inner gimbal structure 36, the center of gravity of the inner gimbal structure 36, and of the gimbal beacon retention device 26G, is below the A-C plane. For example, in various instances, the anchor weight 62 can be a lead band (or other heavy weight metal) disposed around any section of the lower portion 36L (e.g., near the bottom of the lower portion 36L, as illustrated by way of example in FIG. 3). Or, in other instances, the inner gimbal structure 36 can be structured such that the lower portion 36L is fabricated to have a greater amount of material (e.g., thicker) than the upper portion 36U, and therefore weigh more than the upper portion 36U. Or, in other instances, the pivot pins 58 can be located near a top of the inner gimbal structure 36 such that lower portion 36L comprises most of the inner gimbal structure 36, and therefore weighs more than the upper portion 36U.

Figure 5:
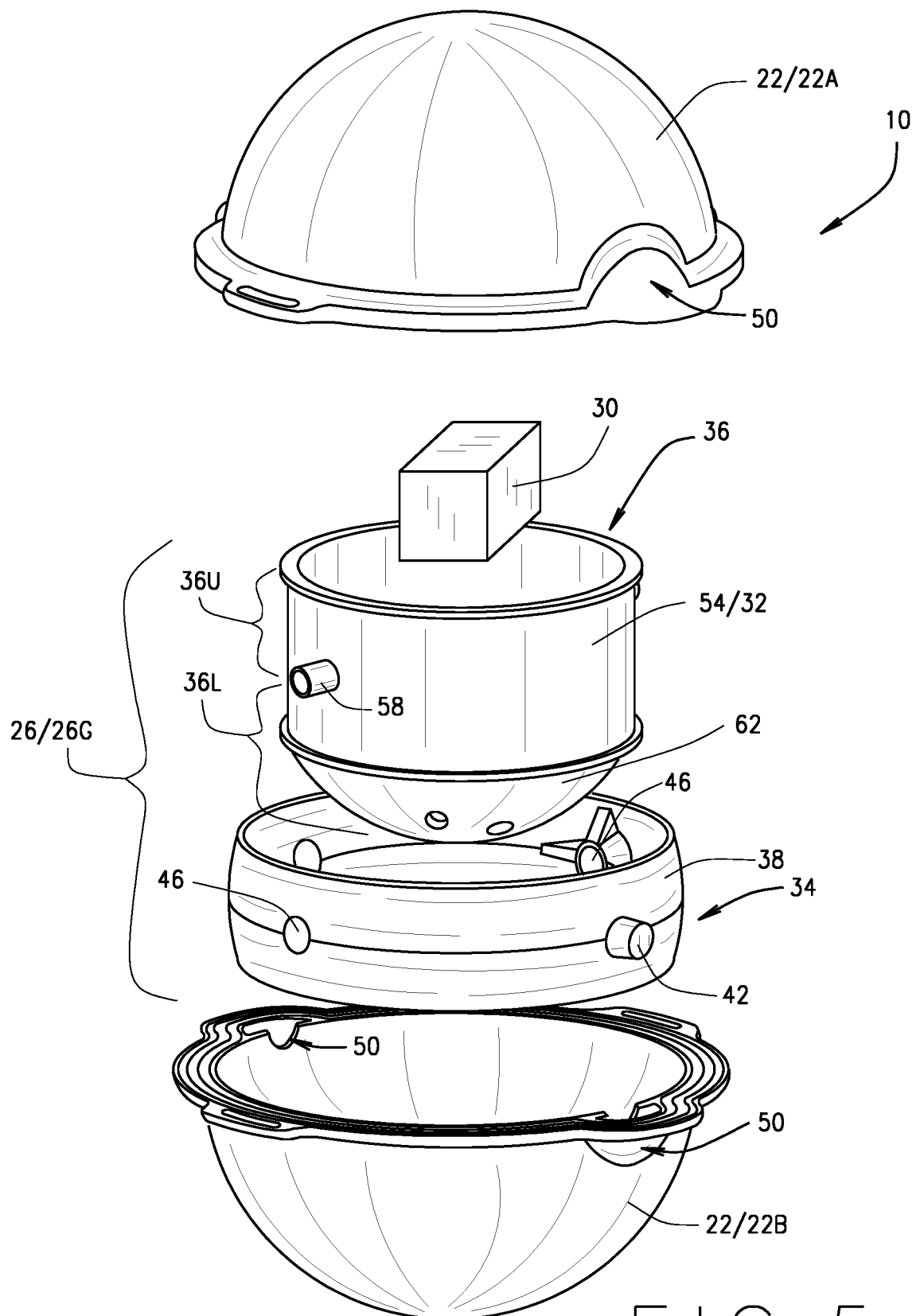
FIG. 5 is an exploded view of the marker shown in FIGS. 2, 3 and 4, wherein the gimbal beacon retention device comprises a weighted bottom, in accordance with various embodiments of the present disclosure.

Alternatively, as illustrated by way of example in FIG. 5, in various instances the anchor weight 62 can be provided by a bottom cap disposed on the bottom of the inner gimbal structure chassis 54. In the embodiments including a bottom cap, the bottom cap can be connected to, affixed to, or integrally form with the bottom of the inner gimbal structure chassis 54. The bottom cap can be fabricated of any desired material (e.g., metal, plastic, etc.) that will add weight to the lower portion 36L of the inner gimbal structure 36, and thereby position the center of gravity of the inner gimbal structure 36, and of the gimbal beacon retention device 26G, below the A-C plane.

As described above, in the embodiments wherein the beacon retention device 26 comprises the gimbal beacon retention device 26G, the main body 32 of the beacon retention device 26 comprises the chassis 54 of the inner gimbal structure 36 of the gimbal beacon retention device 26G. As also described above, the beacon device 30 can be any signal, pulse or field emitting device structured and operable to generate a ground penetrating signal(s) or pulse(s) 14 or field(s) 18 of sufficient strength such that the signal or pulse 14 or field 18 will penetrate the ground from a depth at which the beacon device 30 is buried (e.g., 1 foot, 2 feet, 3 feet, four feet, or more) and be detectable by the specialized detection device from above the ground surface. For example, in various instances, the beacon device 30 comprises an inductance-capacitance (LC) circuit and the field 18 emitted by the LC circuit comprises an electromagnetic field (e.g., an RF field) that will be emitted by the LC circuit when stimulated or pinged by the respective detection device. The LC circuit beacon device 30 comprises one or more inductor coil 66 and one or more capacitor 70 operably connected with the inductor coil(s) 66. The inductor coil(s) 66 of the LC circuit beacon device 30 can have any desired shape, be free wound or wound around any structure (e.g., around a bobbin) and be disposed or carried anywhere on the interior space or surface and/or the exterior surface of the inner gimbal structure chassis 54. The capacitor(s) 70 can also be disposed or carried anywhere on the interior space or surface and/or exterior surface of the inner gimbal structure chassis 54 such that the capacitor(s) 70 can be operatively connected to the coil(s) 66, that is, such that the opposing terminals of the capacitor(s) 70 are electrically connected to opposing ends of the coil(s) 66.

As illustrated by way of example in FIGS. 2, 3, 4 and 5, in such embodiments, the inductor coil(s) 66 (generically, the beacon device 30) can be disposed on or carried by the inner gimbal structure chassis 54 such that when the inner gimbal structure 36 self-orients, as described above, the inductor coil(s) 66 will be oriented such that at least one of the electromagnetic field(s) 18 generated or emitted by the inductor coil(s) 66 will be directed substantially vertically upward toward the ground surface about a substantially vertical line (i.e., about a line having a direction substantially aligned opposite to the direction of the force of gravity). More particularly, the inductor coil(s) 66 are disposed on or carried by the inner gimbal structure chassis 54 such that when the gimbal beacon retention device 26G self-orients, as described above, the inductor coil(s) 66 will be oriented such that they emit electromagnetic field(s) 18 of sufficient strength, and in a direction (e.g., substantially vertically about a substantially vertical line) such that the field(s) 18 will penetrate the ground from a depth at which the beacon device 30 is buried (e.g., 1 foot, 2 feet, 3 feet, four feet, or more) and be detectable by the specialized detection device from above the ground surface. As described above, in various embodiments, the LC circuit beacon device 30 can be controlled by the detection device, such that the LC circuit emits the electromagnetic field(s) 18 in response to being pinged by the detection device, while in other embodiments, the LC circuit beacon device 30 can be structured and operable to self-generate electromagnetic field(s) 18 without being stimulated by the detection device.

Figure 6:
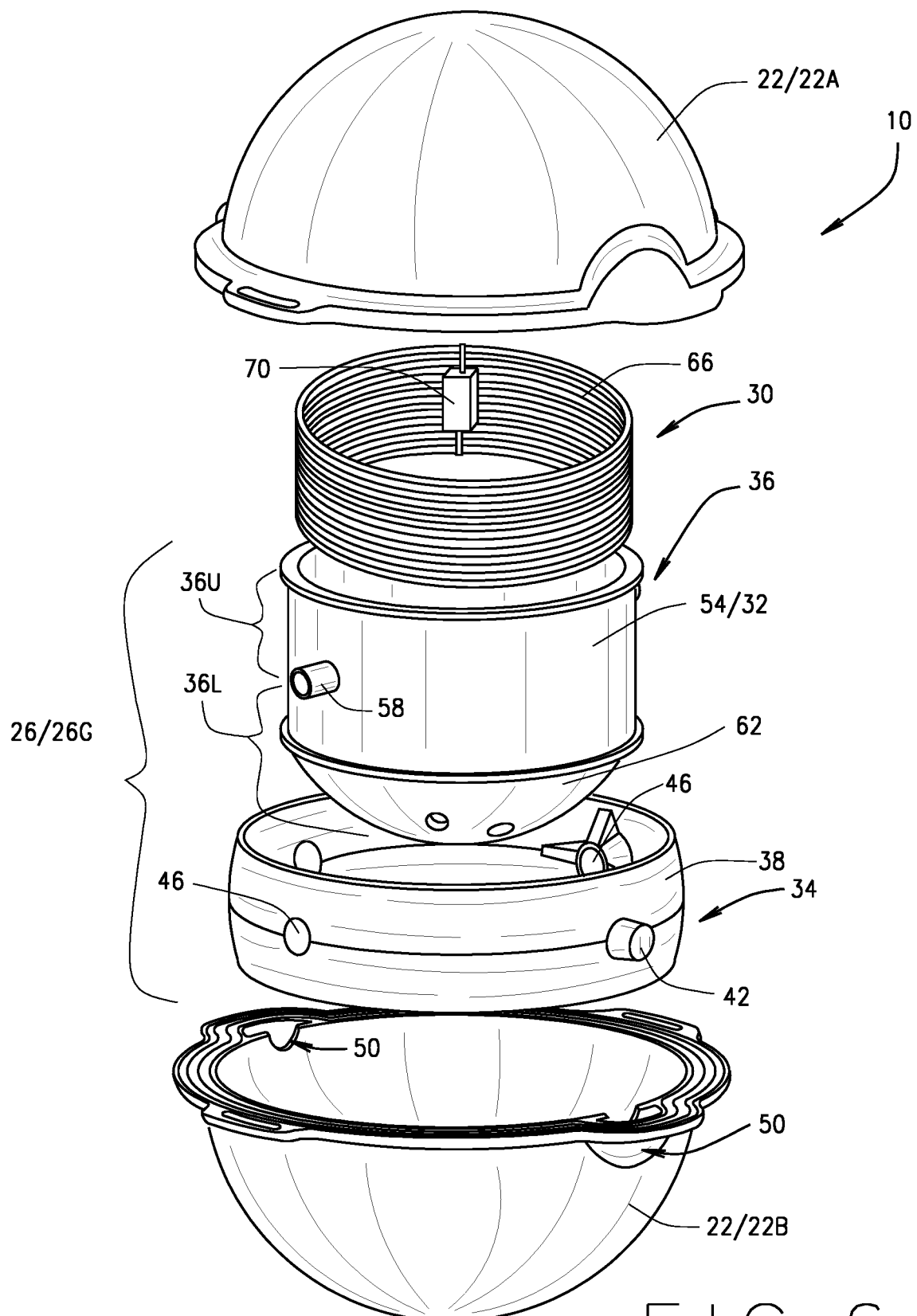
FIG. 6 is an exploded view of the marker shown in FIG. 3, wherein the gimbal beacon retention device retains a beacon comprising an inductance-capacitance (LC) circuit including a free-wound inductor coil, in accordance with various embodiment of the present disclosure.

As shown by way of example in FIG. 6, in various instances the LC circuit beacon device 30 can comprise one or more free wound coil 66 that is/are disposable within the interior space of the inner gimbal structure chassis 54. In various instances, the one or more free wound coil 66 can be free wound to have a cylindrically shape and be disposable along at least a portion of the interior surface of the chassis 54. Although the capacitor(s) 70 is/are shown by way of example in FIG. 6 as being disposed on an interior of the coil(s) 66, the capacitor(s) 70 can be disposed anywhere on the chassis 54 or within the interior space of the chassis 54 and remain within the scope of the present disclosure.

Referring now to FIGS. 1 through 12, as described above, the self-orienting beacon retention device 26 can be any device structured and operable to self-orient such that, when the maker 10 placed in the ground, the beacon device 30 will be disposed in a desired orientation relative to the ground surface regardless of the orientation of the housing 22 relative to the ground surface. More specifically, the self-orienting beacon retention device 26 is structured and operable to self-orient, when the marker 10 is at rest, such that the beacon device 30 carried by the main body 32 will be disposed in a desired orientation relative to a ground surface, so that the signal(s) or pulse(s) 14 or field(s) 18 generated by the beacon device 30 will be generated or emitted in a direction that will penetrate the ground from a depth at which the beacon device 30 is buried (e.g., 1 foot, 2 feet, 3 feet, four feet, or more) and be detectable by the specialized detection device from above the ground surface. As also described above, in various embodiments the beacon 30 can be an LC circuit wherein the beacon retention device 26 is structured and operable to self-orient such that, when the marker 10 is at rest, the inductor coil(s) 66 is/are oriented such that at least one of the electromagnetic field(s) 18 generated or emitted by the inductor coil(s) 66 will be directed substantially vertically upward toward the ground surface about a substantially vertical line (i.e., about a line having a direction substantially aligned opposite to the direction of the force of gravity).

Figure 7:
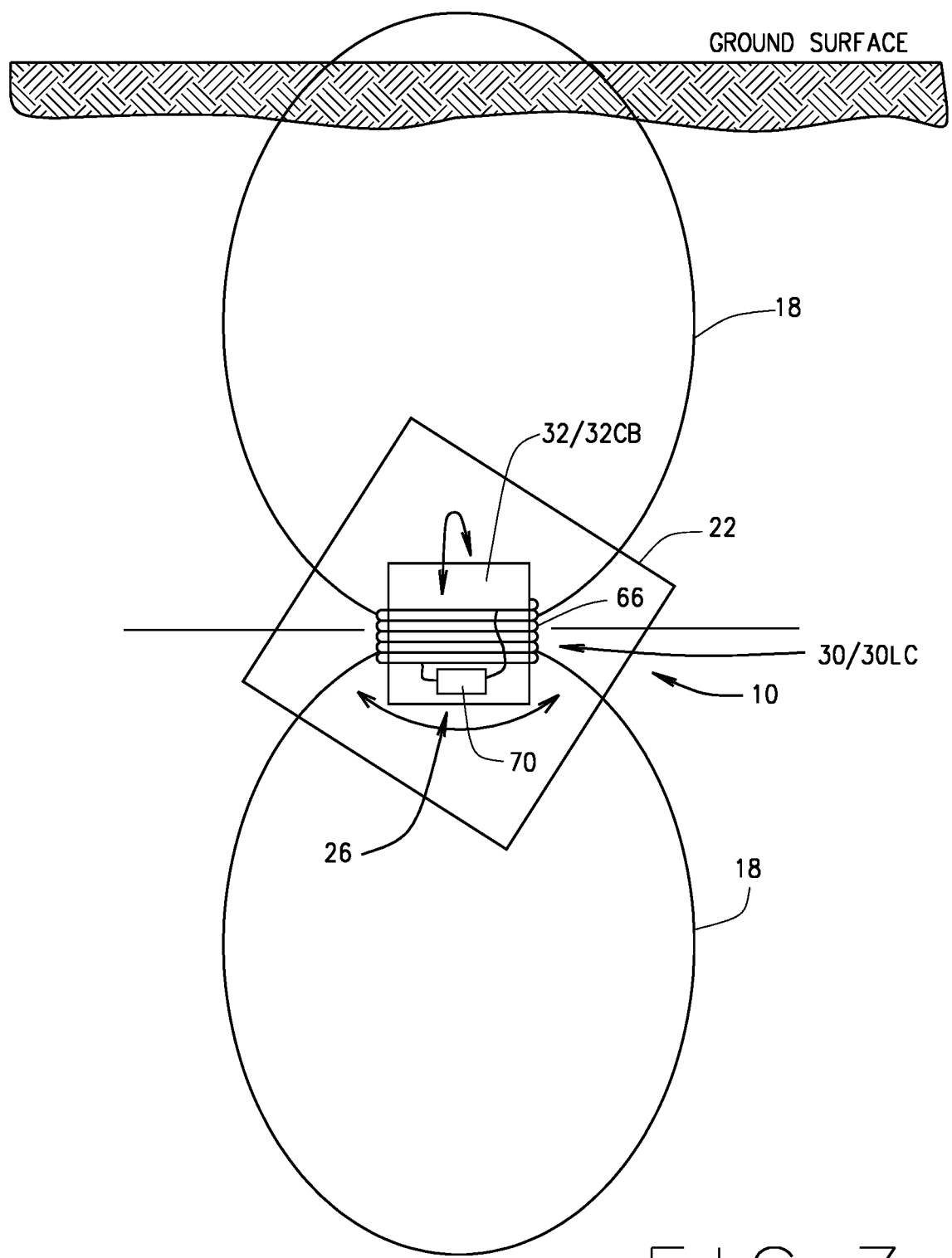
FIG. 7 is a block diagram of the marker device shown in FIG. 1 wherein a main body of self-orienting beacon retention device provides a coil bobbin around which one or more coils of the LC circuit beacon is/are disposed, in accordance with various embodiments of the present disclosure.
Figure 8:
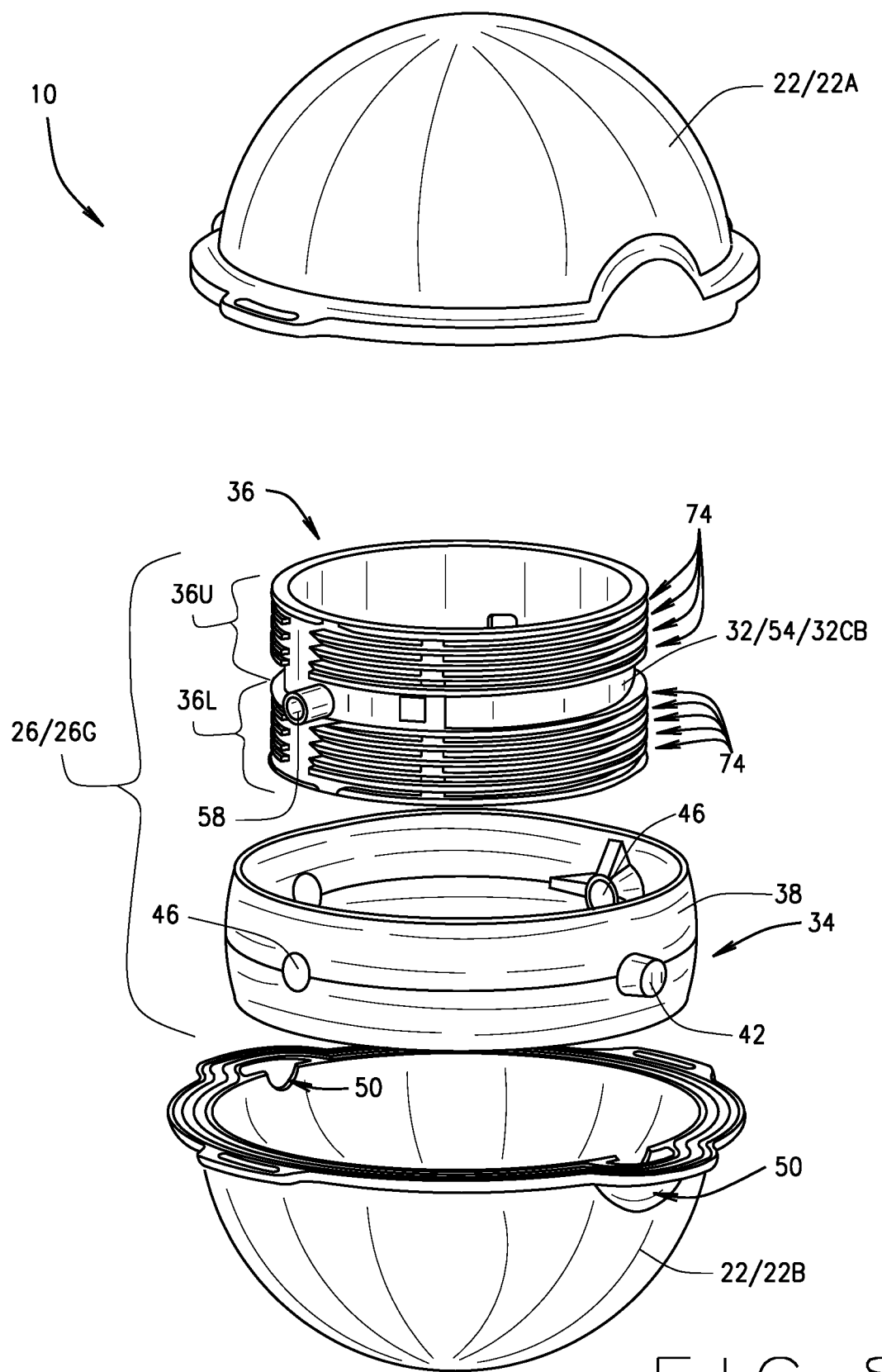
FIG. 8 is an exploded view of the marker shown in FIG. 7 wherein the self-orienting beacon retention device is a gimbal, in accordance with various embodiments of the present disclosure.
Figure 9:
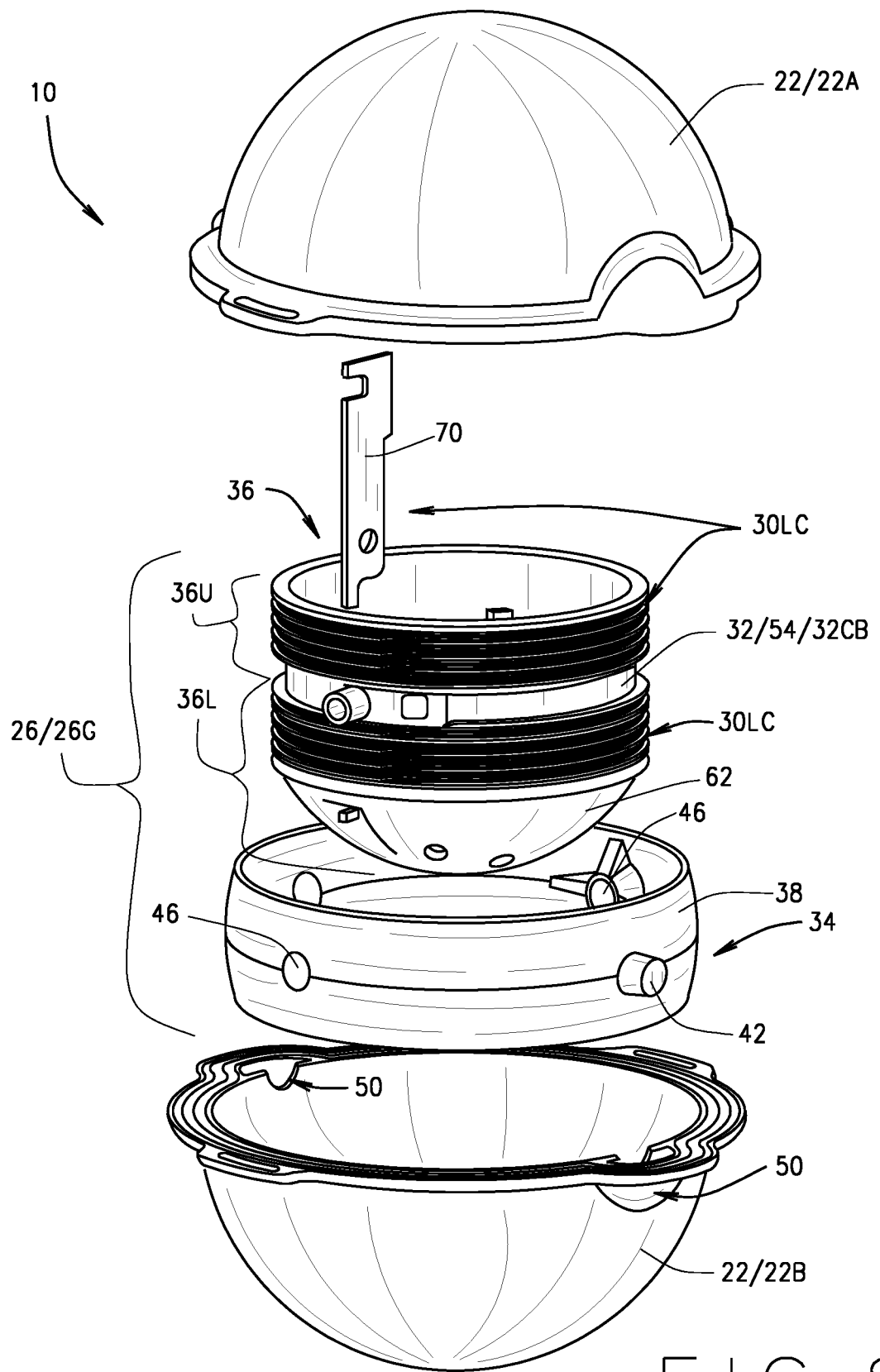
FIG. 9 is an illustration of the marker shown in FIG. 8 wherein a chassis of an inner gimbal structure of the gimbal beacon retention device provides the coil bobbin and the LC circuit beacon is disposed on the coil bobbin, in accordance with various embodiments of the present disclosure.

Broadly, the LC circuit (sometimes referred to herein as the LC circuit beacon 30LC) can be carried by the main body 32 of any desired self-leveling beacon retention device 26, as illustrated by way of example in FIG. 7. Moreover, as illustrated by way of example in FIGS. 7 through 12, in various embodiments, the main body 32 of the respective self-orienting beacon retention device 26 can provide, define and function as a coil bobbin (sometimes referred to herein as the coil bobbin 32CB) around which the inductor coil 66 of the LC circuit beacon 30LC can be wound. Therefore, in such embodiments, the self-orienting beacon retention device 26 is structured and operable to orient the coil bobbin 32CB, and particularly the inductor coil(s) 66, in a desired orientation relative to a ground surface regardless of the orientation of the housing relative to the ground surface. In various instances, the main body/coil bobbin 32/32CB can be structured such that the inductor coil 66 can be automatically wound around the bobbin 32CB by a suitable coin winding machine. Alternatively, the inductor coil 66 can be hand wound around the bobbin 32CB.

Referring now to FIGS. 7 through 11, as described above, in various embodiments, the generic self-orienting beacon retention device 26 of the present disclosure can be the gimbal beacon retention device 26G, wherein the main body 32 of the generic self-orienting beacon retention device 26 is the chassis 54 of the inner gimbal structure 36 of the gimbal beacon retention device 26G. Accordingly, in the various embodiments of the present disclosure wherein the main body 32 provides, defines and functions as the coil bobbin 32CB, and the beacon retention device 26 comprises the gimbal beacon retention device 26G, the chassis 54 of the inner gimbal structure 36 provides, defines and functions as the coil bobbin 32CB.

The inductor coil(s) 66 can be wound around the exterior surface or face of the chassis/coil bobbin 54/32CB using any desired winding technique, system, process or machine. For example in various embodiments, the inductor coil(s) 66 can be wound around the exterior surface or face of the chassis/coil bobbin 54/32CB, manually or by automation, in a single layer helicoid pattern (such as the pattern of the coil shown in FIG. 6), multiple layer helicoid pattern, one or more figure-eight bundle (such that found in various electric motor windings), or any other desired winding pattern. Additionally, the inductor coil(s) 66 can be wound around the exterior surface or face of the chassis/coil bobbin 54/32CB having and desired distribution along the upper and lower portions 36U and 36L of the chassis/coil bobbin 54/32CB. For example, in various embodiments, the inductor coil windings or turns can be evenly distributed over the exterior surface of the upper and lower portions 36U and 36L. Or, in various other embodiments, in order to add weight to the lower portion 36L and thereby lower the center of gravity of the gimbal retention device 26G as described above, the inductor coil windings or turns can be distributed such that a greater amount of the inductor coil windings or turns are wound around the exterior surface of the lower portion 36L of the chassis/coil bobbin 54/32CB than the upper portion 36U.

Figure 10:
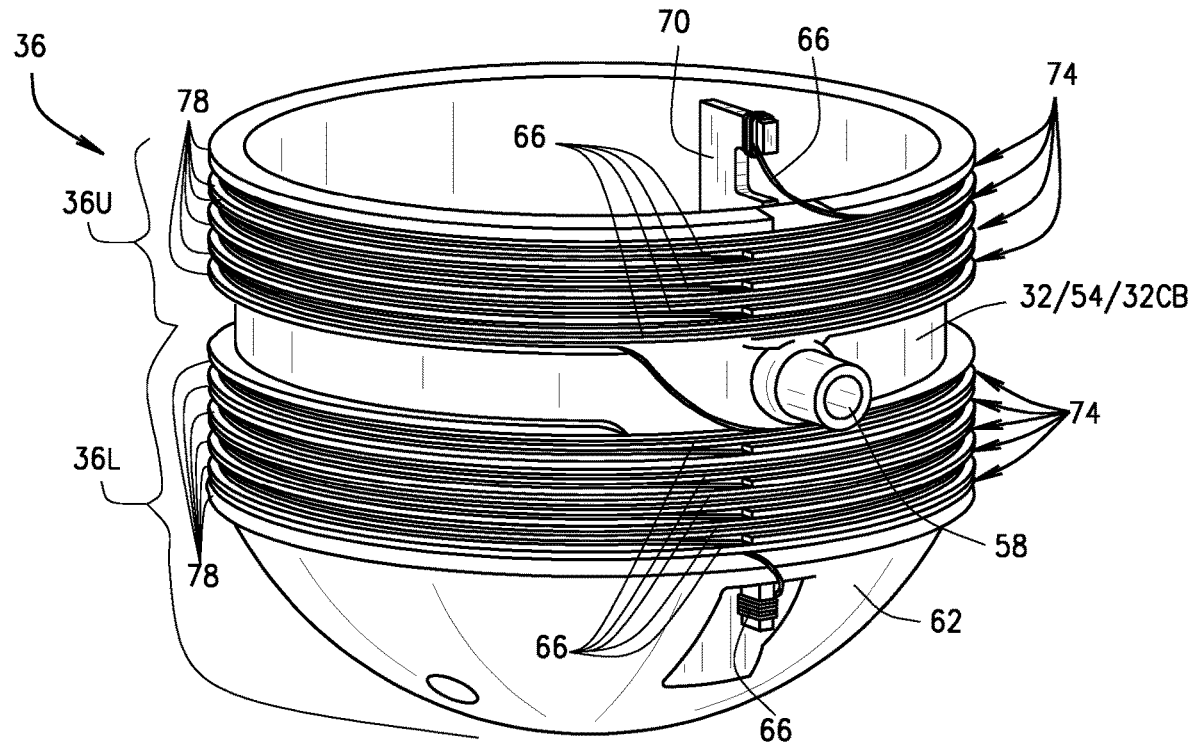
FIG. 10 is an isometric view of the inner gimbal structure shown in FIG. 9, in accordance with various embodiments of the present disclosure.
Figure 11:
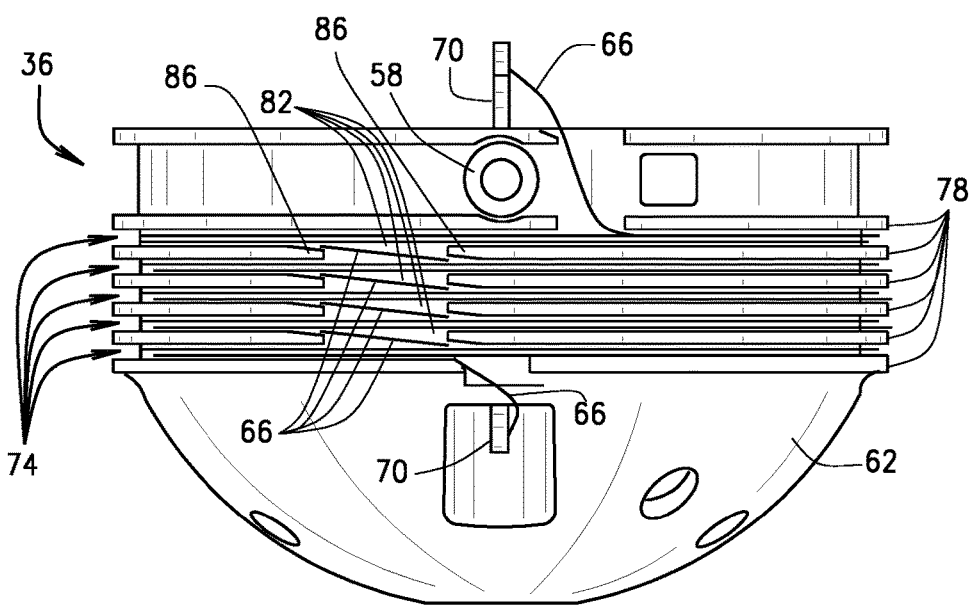
FIG. 11 is a side view of the inner gimbal structure shown in FIG. 9, in accordance with various other embodiments of the present disclosure.

Referring now to FIGS. 8, 9, 10 and 11, in various embodiments, the main body 32, e.g., the lower gimbal structure chassis 54, e.g., the coil bobbin 36CB, can comprises a plurality coil channels 74 disposed around the exterior surface of the chassis/coil bobbin 54/32CB. In such embodiments, the inductor coil(s) 66 can be wound around the chassis/coil bobbin 54/32CB (manually or by automation) within the channels 74. More particularly, as best shown in FIGS. 10 and 11, each of the coil channels 74 comprises a pair of opposing walls 78 that extend radially outward from the exterior surface of the chassis/coil bobbin 54/32CB and define the respective coil channel 74. Accordingly, the inductor coil(s) 66 can be wound around the chassis/coil bobbin 54/32CB (manually or by automation) within the channels 74 between the respective opposing walls 78. The inductor coil(s) 66 can be distributed within the channels 74 in any desired distribution (e.g., any distribution of the number of winds in each respective channel 74) that will generate the electromagnetic field(s) 18 of sufficient strength and direction to penetrated the ground from a depth at which the beacon device 30 is buried and be detectable by the specialized detection device from above the ground surface, as described above. For example, in various other embodiments, in order to add weight to the lower portion 36L and thereby lower the center of gravity of the gimbal retention device 26G to be below the A-C plane, as described above, the inductor coil windings or turns can be distributed such that a greater amount of the inductor coil windings or turns are wound within the channels 74 provided on the lower portion 36U of the chassis/coil bobbin 54/32CB than the upper portion 36U.

Additionally, in various embodiments, the channel walls 78 are formed and structure such that at least a plurality of the channel walls 78 (e.g., each channel wall 78) have a gap 82 (best shown in FIG. 11) provided therein through which the inductor coil(s) 66 can transition from one channel 74 to an adjacent channel 74. Furthermore, in various embodiments the gap 82 in each channel wall 78 defines a pair of opposing wall ends 86. In various instances each wall end 86 is beveled or chamfered (see FIGS. 10 and 11) in order to provide a smooth wall end surface across which the inductor coil(s) 66 can transition from one channel to the adjacent channel without being sharply bent, crimped or damaged.

Referring now to FIGS. 2 through 12, as described above, the LC circuit beacon 30LC comprises the inductor coil(s) 66 and the capacitor(s) 70 operably connected with the inductor coil(s) 66. The capacitor(s) 70 can be disposed or carried anywhere on the interior space or surface and/or exterior surface the main body 32 of the respective self-orienting beacon retention device 26 such that the opposing terminals of the capacitor(s) 70 can be electrically connected to opposing ends of the coil(s) 66. For example, the capacitor(s) 70 can be disposed or carried anywhere on the interior space or surface and/or exterior surface the chassis/coil bobbin 54/32CB of the gimbal beacon retention device 26G such that the opposing terminals of the capacitor(s) 70 can be electrically connected to opposing ends of the coil(s) 66. In various embodiments, the capacitor(s) 70 is/are an integrated circuit board fixedly connected to the interior space or surface of the main body 32 (e.g., fixedly connected to interior space or surface of the chassis/coil bobbin 54/32CB), as shown in FIGS. 9, 10, 11 and 12. It should be noted that if the inductor coil(s) 66 is/are automatically wound onto the main body/coil bobbin 32/32CB (e.g., on to the inner gimbal chassis/coil bobbin 54/32CB) via an automated bobbin/coil winding machine, the integrated circuit board capacitor(s) 70 is securely fixed to the respective main body main body/coil bobbin 32/32CB (e.g., the inner gimbal chassis/coil bobbin 54/32CB) such that it will not be dislodged during winding of the coil(s) 66. The LC circuit beacon 30LC (e.g., the LC beacon integrated circuit board) can be disposed and carried by the main body 32 (e.g., the inner gimbal structure chassis 54) having any orientation and/or mounting and remain within the scope of the present disclosure.

Figure 12:
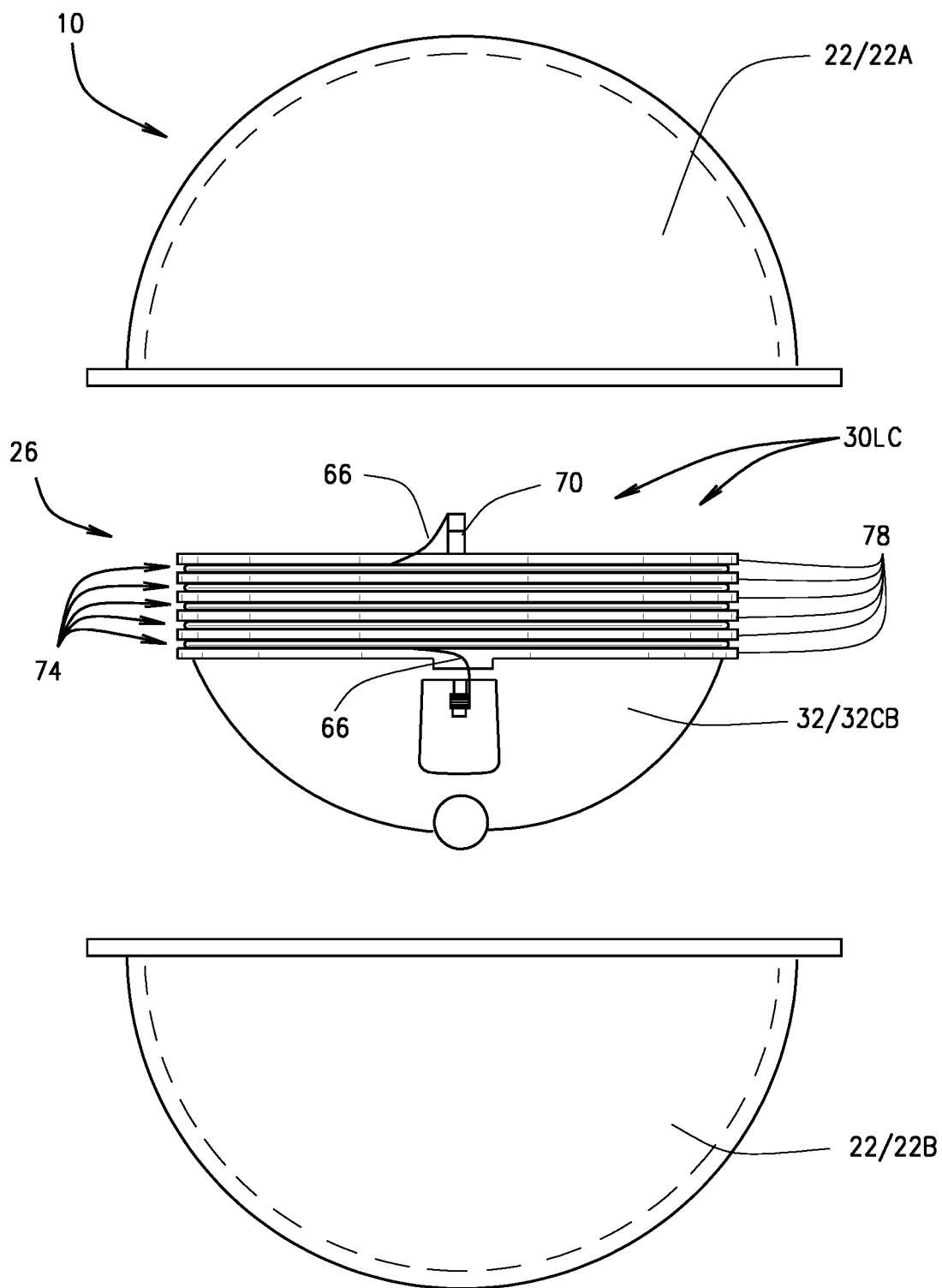
FIG. 12 is an exploded view of the of the marker shown in FIG. 7, in accordance with various embodiments of the present disclosure.

Referring now to FIGS. 7 and 12, although the LC circuit beacon 30LC, coil channels 74, channel walls 78, channel gaps 82 and channel ends 86 have been described above with regard to the embodiments of the marker 10 wherein the self-orienting beacon retention device 26 comprises the gimbal beacon device 26G, it should be understood that the same structure, features, and functionality of the LC circuit beacon 30LC, coil channels 74, channel walls 78, channel gaps 82, and channel ends 86 are applicable to any self-orienting beacon retention device 26, and remain within the scope of the present disclosure. For example, the LC circuit beacon 30LC can be implemented in, and coil channels 74, channel walls 78, channel gaps 82 and channel ends 86 can be formed around the exterior surface of, a rotatable self-leveling spherical or semi-spherical LC circuit beacon retention device 26 such as that shown by way of example in FIG. 12, or any other self-leveling LC circuit beacon retention device 26.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A marker for burying adjacent an underground structure such that a location of the underground structure can be identified from above a ground surface, said marker comprising:
    a housing;
    a beacon device; and
    a gimbal beacon retention device rotatably disposed within the housing and to which the beacon device is connected, the gimbal beacon retention device comprising:
        an outer gimbal structure rotatably disposed within the housing; and
        an inner gimbal structure rotatably disposed within the outer gimbal structure, the inner gimbal structure comprising a cylindrical chassis and a pair of opposing pivot pins extending radially outward from the chassis and defining an inner gimbal structure axis of rotation, the chassis having an upper portion disposed above the inner gimbal structure axis of rotation and a lower portion disposed below the inner gimbal structure axis of rotation,
    wherein the beacon device is carried by the inner gimbal structure, and wherein the inner gimbal structure is structured such that, with the beacon device carried therein, the lower portion of the inner gimbal structure chassis is heavier than the upper portion of the inner gimbal structure chassis so that the gimbal beacon retention device is structured and operable to only rotate between 0° and 360° about a first axis and between 0° and 360° about a second axis only that is orthogonal to the first axis to orient the beacon device in a desired orientation relative to a ground surface regardless of the orientation of the housing relative to the ground surface.

2. The marker of claim 1, further comprising an anchor weight one of connected to or integrally formed with the lower portion of the inner gimbal structure chassis.

3. The marker of claim 2, wherein the anchor weight comprises a bottom cap of the inner gimbal structure.

4. The marker of claim 2, wherein the anchor weight comprises a weight band disposed around the lower portion of the inner gimbal structure chassis.

5. The marker of claim 1, wherein the housing has a substantially spherical shape.

6. The marker of claim 1, wherein the beacon device is structure and operable to, when oriented in the desired orientation by the gimbal beacon retention device, controllably generate one or more of at least one of ground penetrating signals, ground penetrating pulses, and ground penetrating fields of sufficient strength such that the one or more of at least one of ground penetrating signals, ground penetrating pulses, and ground penetrating fields will penetrate the ground from a depth at which the beacon device is buried and be detectable by a detection device from above the ground surface.

7. The marker of claim 6, wherein the beacon device comprises an inductance-capacitance circuit comprising at least one inductor coil and at least one capacitor operably connected to with the inductor coil, the inductance-capacitance circuit structured and operable to controllably emit at least one ground penetrating electromagnetic field will penetrate the ground from a depth at which the beacon device is buried and be detectable by the detection device from above the ground surface.

8. The marker of claim 7, wherein the inductor coil is free wound and disposed within an interior of the inner gimbal structure.

* * * * *